United States Patent [19]

Marusak

[11] Patent Number: 5,253,590
[45] Date of Patent: Oct. 19, 1993

[54] ULTRA HIGH-SPEED PNEUMATIC TRANSPORTATION SYSTEM

[76] Inventor: Henry Marusak, R-1 Box 302, Williams, Ind. 47470

[21] Appl. No.: 871,499

[22] Filed: Apr. 21, 1992

[51] Int. Cl.$^5$ ............................................. B61B 13/00
[52] U.S. Cl. .................................................. 104/138.1
[58] Field of Search ........................ 104/138.1; 105/365

[56] References Cited

U.S. PATENT DOCUMENTS

| | | | |
|---|---|---|---|
| 3,368,496 | 2/1968 | Falk | 104/18 |
| 3,404,638 | 5/1968 | Edwards | 104/156 |
| 3,438,337 | 4/1969 | Edwards | 104/156 |
| 3,508,497 | 4/1970 | Matsukata | 104/138 |
| 3,823,672 | 7/1974 | Fellows et al. | 104/23 |
| 3,881,425 | 5/1975 | Carstens | 104/138.1 |
| 3,934,515 | 1/1976 | Cushman | 104/18 |
| 3,954,064 | 5/1976 | Minovitch | 104/138 |
| 3,980,024 | 9/1976 | Futer | 104/138.1 |
| 3,999,487 | 12/1976 | Valverde | 104/155 |
| 4,023,500 | 5/1977 | Diggs | 104/138.1 |
| 4,170,944 | 10/1979 | Zhukov et al. | 104/138.1 |
| 4,305,334 | 12/1981 | Augenreich et al. | 104/138.1 |
| 4,852,497 | 8/1989 | Tsui | 104/138.1 |
| 4,881,446 | 11/1989 | Marks et al. | 104/138.1 |

FOREIGN PATENT DOCUMENTS 3402974  8/1985  Fed. Rep. of Germany ... 104/138.1

OTHER PUBLICATIONS

"Air-Powered El Train Would Hit 300 MPH", Popular Mechanics, Mar. 1991, p. 17, Fillon et al.
"150-Mph Train To Link Florida Cities", Popular Mechanics, Jul. 1990, p. 11, Fillon et al.
"Running On Air", Popular Science, Oct. 1991, pp. 76–77.
"Electro Magnetic Fields, In Search of the Truth", Popular Science, Dec. 1991, pp. 87–90.

Primary Examiner—Mark T. Le

[57]  ABSTRACT

An ultra high-speed transportation system comprising a prepared tube for moving people and cargo in vehicles being propelled by a variable-speed motor ultra high-speed air stream generator, a continuous moving ultra high-speed air stream of air within the prepared tube that is end to end, or continuous without end, with a series of load-unload stations that do not have the stream moving through the station. The air stream is bypassed around the station back into the main transportation tube, so as not to interfere with loading and unloading of the vehicles. The vehicle when traveling in the tube is kept from the tube wall and kept in the approximate tube center by the force of the moving air stream, having to move around and past the vehicle that fills only about two thirds of the tube's opening, because the air stream is moving at a higher rate of speed than the vehicle. In ground level where the transportation tube direction in elevation changes up or down, to keep the gravitational forces from becoming intolerable on the passengers, an air stream generator is used to bypass some of the air stream to lower the vehicle speed. In movement of non-living cargo optimum speed is used, disregarding the G. forces.

5 Claims, 4 Drawing Sheets

ULTRA HIGH-SPEED PNEUMATIC TRANSPORTATION SYSTEM

BACKGROUND—FIELD OF INVENTION

This invention relates to a pneumatic ground transportation system for moving people, vehicles and cargo in a prepared tube, at an ultra high speed.

BACKGROUND—DESCRIPTION OF PRIOR ART

Some systems have been proposed which purportedly produce efficient high-speed ground based transportation. Among these systems are the pneumatic propulsion systems. A pneumatically powered system is one in which a vehicle is propelled in a duct as a free piston therein by establishing differential pressure between the front and rear of the vehicle in the duct. Thus, with gas in the duct in front of the vehicle at a lower pressure, and gas in the duct at a pressure which is high relative to the front gas pressure located at the rear of the vehicle, the vehicle is rapidly propelled. Vehicles in most of the known pneumatically powered ground transportation systems ride on tracks or slides and hence suffer drawbacks due to friction which are similar to those discussed above with reference to railroad transportation systems. Furthermore, due to the speeds proposed for these vehicles, shocks to, and vibration of, cargo and passengers may reach intolerably high levels. Noise may also reach intolerable levels. Frictional heating may also damage the tracks and/or the vehicle wheels thus creating safety and maintenance problems. Thus known pneumatically powered systems utilizing tracks or slides to support and guide the vehicle have inherent drawbacks which have prevented them from gaining wide acceptance. Others have complex seals, or very complex valve means that make their drawbacks too great for acceptable use. The biggest drawback of systems using seals is constant wear of the seals and the tremendous cost in the machined surfaces seals move on. Also when distance is required the fitting of sections add to the cost, or in systems that use very complex tunnel tube construction the cost is so high it becomes prohibitive.

The so-called ground effect machines eliminates frictional resistance to vehicle movement by supporting the vehicle on pressurized air ejected from the bottom of the vehicle. Such vehicles are not compatible with pneumatically powered vehicle systems as the pressurized air ejected from the vehicle will inhibit or destroy the vacuum conditions present ahead of the vehicle. Hence, the ground effect machine may eliminate frictional resistance to movement of the vehicle, but in doing so, may also eliminate the source of propulsion for the vehicle. The equipment required to produce the stream of pressurized air from the vehicle bottom must be carried onboard the vehicle, reducing the space available for transportation of people, or cargo.

The so-called levitation systems in having many of the above mentioned drawbacks has another one that just now is coming to light. The fact is the L. V. system is like a stretched out motor. The passenger sits in the middle of all this. The resulting E M.F. bombardment on the passenger may be much greater than electrical transformers, T. V., or electric blankets. Studies are now under way to find if E.M.F. causes cancer. Two researcher found childhood leukemia accorded twice as often in houses close to multiple thick high-current distribution lines. Congress has appropriated $600,000 for a 1992 study by the National Academy of Sciences about the effects of E.M.F. on this possible cancer link to E.M.F.

SUMMARY OF THE INVENTION

The object of the present invention is to overcome many disadvantages of other transportation systems.

The transportation system of the present invention includes a mainline tube in the form of an endless loop or a line having ends. The tube may be located below, above or at ground level and forms a travel path for vehicles. The transportation system includes variable ultra high-speed air stream generators provided along the tube for producing an air stream for moving the vehicles along the tube. The transportation system includes structures for bypassing the air stream around loading and unloading stations located along the tube, thus preventing any effect of the air stream on vehicles in the stations. The transportation system further includes a structure for reducing the speed of a vehicle generally at an inclined section of the tube so as to lower the gravitational force on passengers on the vehicle at the inclined section. The vehicles include structures and shapes to maintain the vehicles away from the wall of the tube and in an upright orientation.

BRIEF DESCRIPTION OF THE DRAWING

Referring now to FIG. 1 and 2 of the drawings. 21 is the prepared tube with air stream 22 shown as broken lines with arrowheads.

FIG. 3 shows a portion of the transportation system, showing the air stream 22 as broken lines with arrowheads moving through a prepared tube 21 then through the holes or slots 23 in the prepared tube in the manifold area 24 and into the bypass tube 25 moved on by the variable-speed ultra high-speed air stream generator 26 past the station 27 into the aft manifold 28 aft of the gate 29 that prevents the air stream from moving into the station from the gated side. The moving air stream bypassed around the station. There is no air stream moving in the load and unload area of the station, thus having no effect on the vehicle 30. In FIG. 3 the generator 26 using a variable ultra high-speed motor 35 with impeller blades 60 to move the air stream. If required these generators can be placed at intervals in the system to maintain a desired air stream flow.

FIG. 4 shows a portion of the A.S.T. (Air Stream Transportation) system 31 with a particular vehicle 30 moving in an upgrade 32 having a variable-speed, ultra high-speed air stream generator that is shaded on the drawing. This assembly being similar to assembly shown in FIG. 3 having a like use in sharp turns or before entering a station in the A.S.T. system. In its use in FIG. 4 a signal is received by an automatic speed control unit 34 that controls the variable speed motor air stream generator 26. The speed control 34 receiving a signal of the speed from the moving vehicle 30 in the area A,40. This starts the generator 26 bypassing some of the moving air stream 22 from the area A-2, 36 to area C-1, 37 as required until vehicle 30 entering area C, 38 is to resume its normal speed. Simultaneously when a signal is passed to the speed control unit 34, another signal is passed that only acts upon the air stream assembly 39 shown in FIG. 5 using some of the moving air stream from area A,40 is used to bombard the air stream at the oncoming vehicle to slow the moving vehicle in area A-1, 33. These assemblies shown in FIGS. 4 and 5 are similar except in the braking assembly shown in FIG. 5. The braking aft manifold 42 has the air stream moving through tubes 41 directed at the oncoming moving vehicle 30. When this vehicle 30 moves into area A-2, 36, shown in FIG. 4, the braking signal is turned off. Notice that the air stream is by-passed in the system in the area A-2, 36 before the grade, so that when the passenger vehicle enters the grade area B, 32 the moving vehicle is already slowed so as to lower the gravitational force on the passenger, before it moves in the up-grade area B, 32.

FIG. 6 is a drawing of the vehicle 30 having built into it an adjustable air blocking fin's 43. The moving of these fins in essence changes the vehicle size within the prepared tube opening, thus having a direct bearing on the vehicle speed when traveling within the A.S.T. system. A trim means 44 could be added to the vehicle if required to help the vehicle maintain moving in the center of the prepared tube.

FIG. 7 shows the moving vehicle's moving with the air stream 22 in a prepared tube 21 of an A.S.T. system. The air stream reacting on moving vehicles 45, 30, and 46 within the prepared tube of the A.S.T. system. Vehicle 43 has small, extendable wheels 47 that are not necessary except for moving the vehicle at the station (because in viewing single video frames of the first working model in operation) the vehicle reacts to the moving air stream by the vehicle being first lifted, or simultaneously lifted in relevance to its forward movement. In this drawing vehicles 45 and 30 are coupled together, as in a train 55, or move individually seperated from each other by the inherent air stream capillary action between vehicles. Vehicle 46 is shown with a raparound bumper 48 for rapid storage at the station. Also embedded in the bottom of the vehicle are permanent magnets 49; an electromagnet 50 installed in the prepared tube 21 is used for slowing and braking the vehicle.

FIG. 8 shows a particular vehicle 51 with a weight 52 in the bottom of the vehicle when the A.S.T. system is of the round prepared tube type, used to keep the moving vehicle in an upright position.

FIG. 9 show an end view of a prepared tube 21 of an A.S.T. system using a square prepared tube, with a matching shaped vehicle 53. The moving air stream 22 keeps an even pressure around the vehicle to keep it automatically upright 54. Another shape is shown in FIG. 10.

FIG. 11 shows how advantageous a square A.S.T. system is when stacked or fastened together.

FIG. 12 is a drawing that shows rapid storage of individual vehicles 46, a row of unloaded electric cars 56 and a row of car battery packs 57, a conveyor means 58 and a row of storage guides 59.

Figure 1:
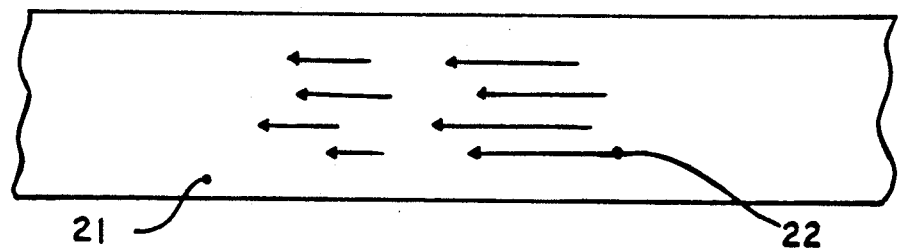
FIG. 1 is a view of a ultra high-speed air stream moving in a prepared tube end to end.
Figure 2:
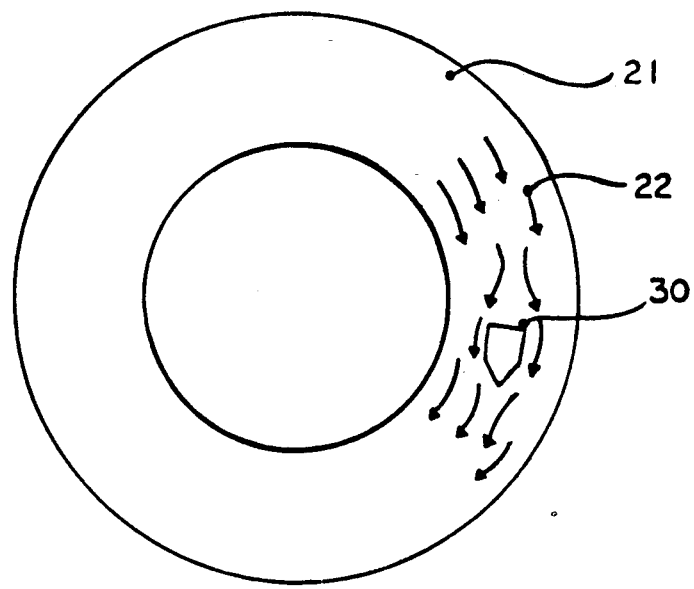
FIG. 2 is a view of a ultra high-speed air stream moving in a prepared tube that is continuous without end.
Figure 3:
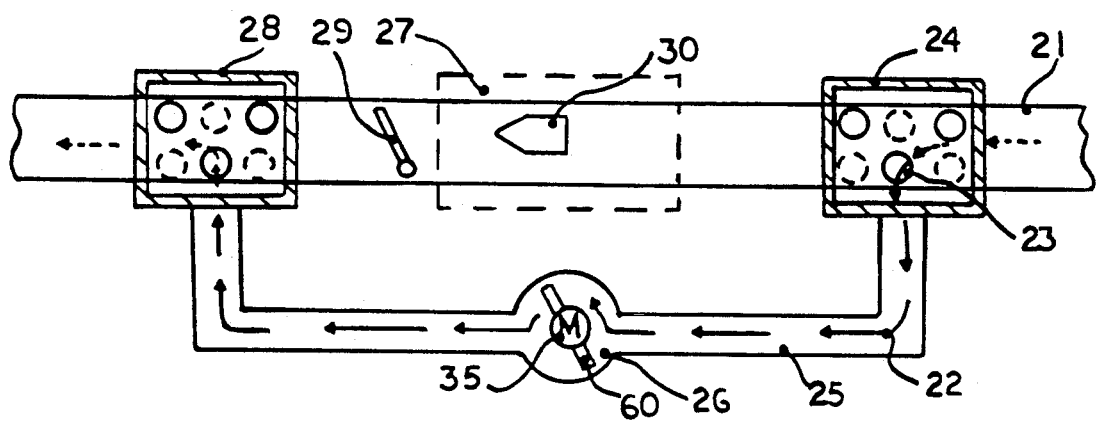
FIG. 3 is a view of the prepared tube, the station and the ultra high-speed air stream generator with its manifold's its bypass tube, with arrowed lines that represent the air stream moving from before the station through the variable-speed motor air stream generator, to the after the station prepared tube.
Figure 4:
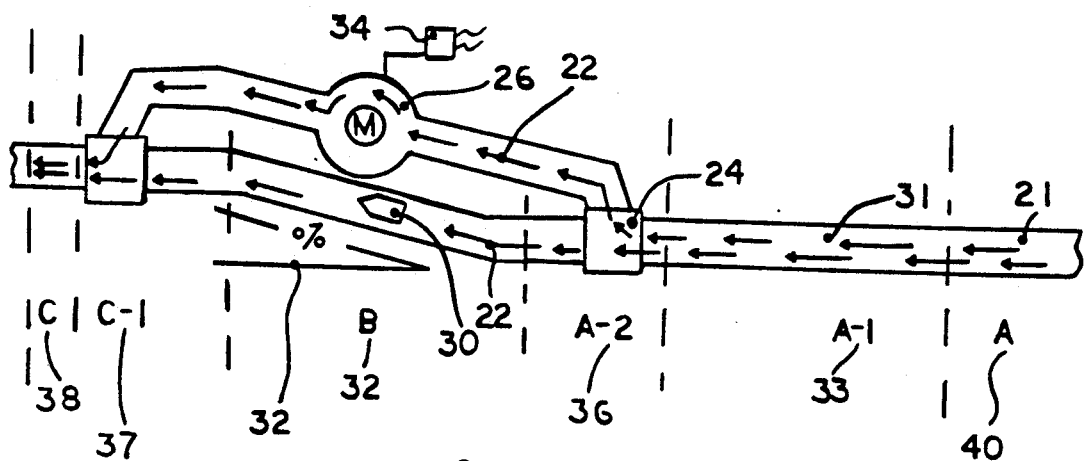
FIG. 4 is a shaded view showing some of the air stream being bypassed by a elevated grade in the system using the air stream generator.
Figure 5:
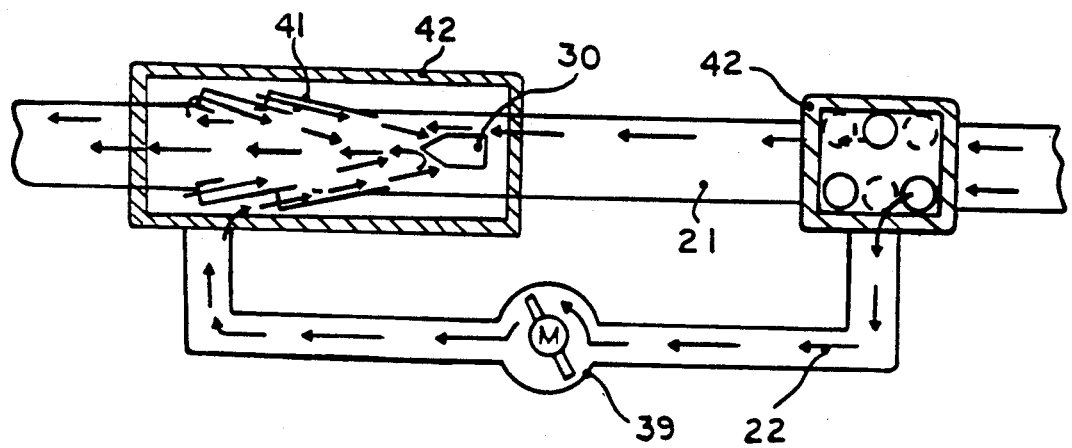
FIG. 5 is a view showing how some of the air stream is used to slow the vehicle while moving in the prepared transportation tube.
Figure 6:
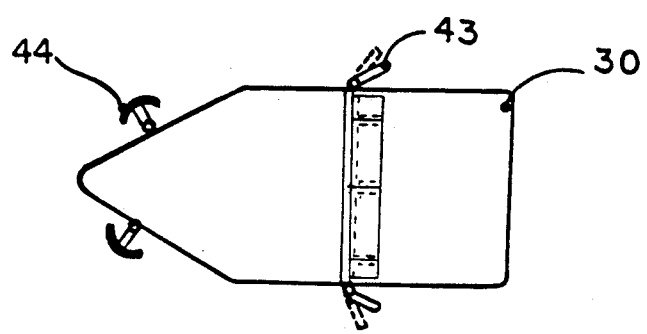
FIG. 6 illustrates a vehicle with added means to improve tube centering ability, airfoil and fin to vary the vehicle speed when moving in the system.
Figure 7:
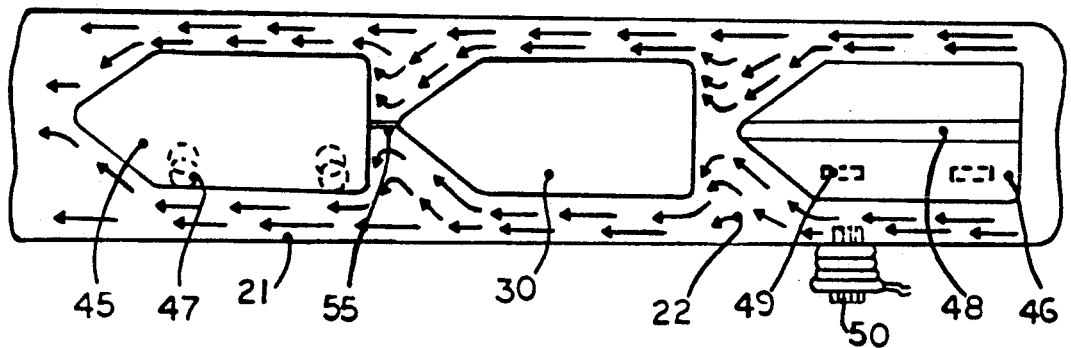
FIG. 7 illustrates the air stream as arrowed broken lines, moving past two attached and one unattached vehicles. One vehicle has braking means with a wrap-around bumper; one vehicle has retractable wheels.
Figure 11:
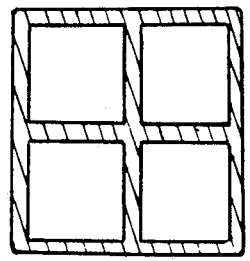
FIG. 11 is a view of square prepared tubes, side by side and stacked.
Figure 9:
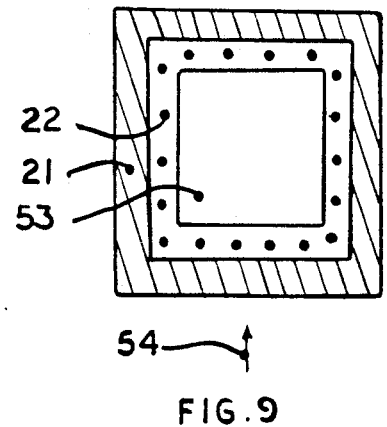
FIGS. 9 and 10 are the views of prepared tubes which are shaped to maintain vehicles, travelling therein, upright.
Figure 8:
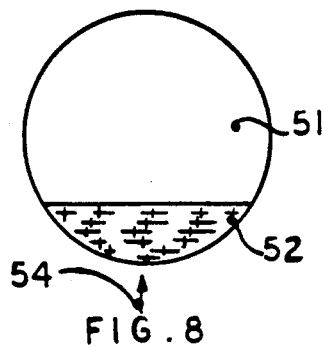
FIG. 8 is a view of a round vehicle with shaded area representing weight, to keep it upright.
Figure 10:
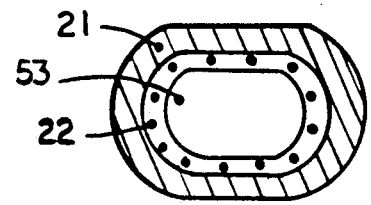
Figure 12:
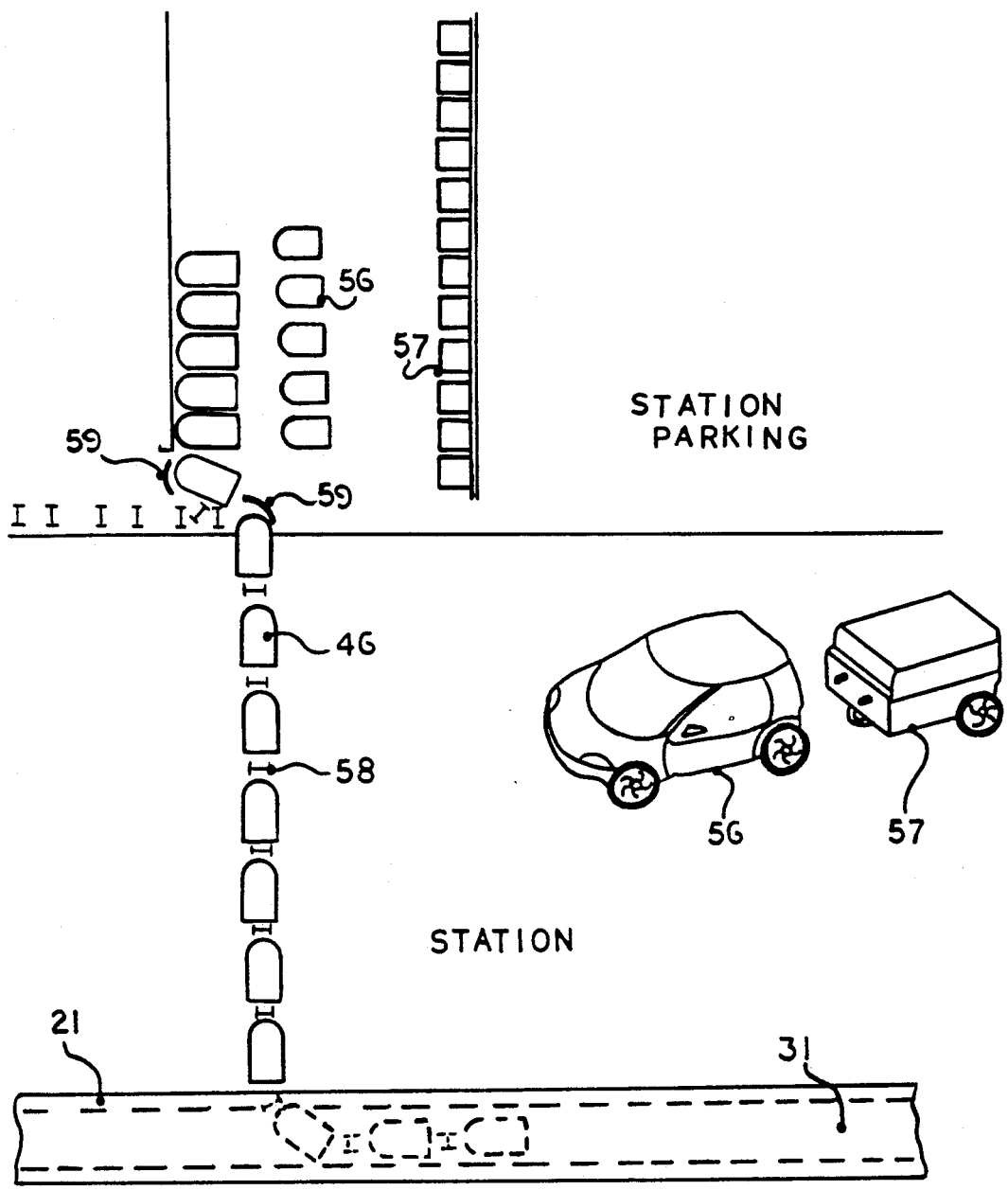
FIG. 12 is a view of a station, showing rapid storage of electric cars.

I claim:

1. A high-speed pneumatic transportation system comprising:
    a main line having a tubular cross-section and defining a travel path, said main line including at least a horizontally oriented section connected to at least an inclined section;
    at least one vehicle movable along inside said main line;
    generator means for generating an air stream inside said main line for forcing said at least one vehicle to move along inside said main line;
    vehicle speed reducing means provided generally at said inclined section for reducing the speed of said at least one vehicle generally at the inclined section so as to lower gravitational force imposed on passengers in said at least one vehicle;
    said vehicle speed reducing means including a first means, located near an entry to said inclined section, for bypassing a portion of the air stream inside the horizontal section and directing said portion of the air stream against the front end of said at least one vehicle travelling toward the inclined section, so as to reduce the speed of said at least one vehicle travelling toward the inclined section;
    said vehicle speed reducing means further including a second means, located at the inclined section, for bypassing a portion of the air stream around said inclined section, for reducing the air stream in the inclined section.

2. The high-speed pneumatic transportation system as claimed in claim 1, wherein said travel path has ends.

3. The high-speed pneumatic transportation system as claimed in claim 1, wherein said travel path forms an endless loop.

4. The high-speed pneumatic transportation system, as claimed in claim 1, further comprising at least one station along the main line for loading and unloading, and means for bypassing the air stream in said main line at said at least one station, for preventing air stream effect on said at least one vehicle in said at least one station.

5. The high-speed pneumatic transportation system, as claimed in claim 1, wherein said at least one vehicle has a non-rounded shape.

* * * * *